United States Patent
Kawatsu et al.

(10) Patent No.: US 10,946,900 B2
(45) Date of Patent: Mar. 16, 2021

(54) VEHICLE BODY FRONT STRUCTURE

(71) Applicant: HONDA MOTOR CO., LTD., Tokyo (JP)

(72) Inventors: Raika Kawatsu, Wako (JP); Takehiro Ishihara, Wako (JP); Takuya Morisawa, Wako (JP); Yoshikazu Shoi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 62 days.

(21) Appl. No.: 16/479,465

(22) PCT Filed: Dec. 25, 2017

(86) PCT No.: PCT/JP2017/046363
§ 371 (c)(1),
(2) Date: Jul. 19, 2019

(87) PCT Pub. No.: WO2018/135245
PCT Pub. Date: Jul. 26, 2018

(65) Prior Publication Data
US 2019/0389512 A1 Dec. 26, 2019

(30) Foreign Application Priority Data
Jan. 20, 2017 (JP) .............................. JP2017-008104

(51) Int. Cl.
B60J 7/00 (2006.01)
B62D 25/04 (2006.01)
(Continued)

(52) U.S. Cl.
CPC ............. B62D 25/04 (2013.01); B62D 25/06 (2013.01); B62D 25/08 (2013.01);
(Continued)

(58) Field of Classification Search
CPC ......... A47F 1/085; B62B 15/00; D04B 1/108; D04B 1/246; B60R 21/232; B60R 21/213;
(Continued)

(56) References Cited

U.S. PATENT DOCUMENTS 5,772,277 A * 6/1998 Fukuda .................. B62D 25/04
296/146.15
6,152,485 A * 11/2000 Kato ..................... B60R 21/213
280/728.2
(Continued)

FOREIGN PATENT DOCUMENTS

EP 1 241 079 A2 9/2002
JP 2003-237622 A 8/2003
(Continued)

OTHER PUBLICATIONS

Extended European search report dated Feb. 6, 2020 in the corresponding EP Patent Application No. 17892808.1.

Primary Examiner — Kiran B Patel
(74) Attorney, Agent, or Firm — Carrier Blackman & Associates, P.C.; Joseph P. Carter; William D. Blackman

(57) ABSTRACT

Provided is a vehicle body front structure capable of ensuring both driver visibility and collision performance. This vehicle body front structure comprises: a front pillar which has an A-pillar, an A'-pillar located behind the A-pillar, and a lower frame portion connecting the lower ends of the A-pillar and A'-pillar; and a top-side upper member which is disposed above a wheelhouse and connected to a lower-frame-portion upper member connecting portion. Ridge lines are formed across the upper member connecting portion, the lower frame portion, and the A'-pillar.

20 Claims, 6 Drawing Sheets

(51) Int. Cl.
*B62D 25/06* (2006.01)
*B62D 25/08* (2006.01)
*B62D 25/20* (2006.01)
*B62D 27/02* (2006.01)
*B62D 21/15* (2006.01)

(52) U.S. Cl.
CPC ....... *B62D 25/2045* (2013.01); *B62D 27/023* (2013.01); *B62D 21/152* (2013.01)

(58) Field of Classification Search
CPC ...... B60R 22/24; B62D 25/04; B62D 25/025; D10B 2403/0333
See application file for complete search history.

(56) References Cited

U.S. PATENT DOCUMENTS

| | | | | |
|---|---|---|---|---|
| 7,052,078 B2* | 5/2006 | Akasaka | ............. | B62D 25/081 296/191 |
| 7,140,674 B2* | 11/2006 | Miyoshi | ................. | B62D 25/04 296/203.03 |
| 7,296,824 B2* | 11/2007 | Yasui | ................... | B62D 21/152 280/784 |
| 7,469,956 B2* | 12/2008 | Yasuhara | ................ | B60R 19/34 293/133 |
| 7,594,692 B2* | 9/2009 | Shishido | ............. | B62D 25/081 296/193.06 |
| 7,731,272 B2* | 6/2010 | Moore | ................... | B62D 25/04 296/187.09 |
| 7,806,468 B2* | 10/2010 | Lessmeister | ........... | B62D 25/06 296/210 |
| 7,934,746 B2* | 5/2011 | Glaser | ................... | B60R 13/025 280/728.3 |
| 8,109,532 B2* | 2/2012 | Schirm | ................. | B60R 21/213 280/730.2 |
| 8,256,831 B2* | 9/2012 | Abe | ..................... | B62D 25/082 296/203.02 |
| 8,366,184 B2* | 2/2013 | Ogawa | .................. | B62D 25/06 296/193.06 |
| 8,491,046 B2* | 7/2013 | Nagai | .................... | B62D 25/02 296/193.05 |
| 8,979,166 B2* | 3/2015 | Yamanaka | ............. | B21J 15/041 296/146.15 |
| 9,108,680 B2* | 8/2015 | Suzuki | ............... | B62D 25/2018 |
| 9,302,710 B2* | 4/2016 | Bach | ..................... | B62D 27/023 |
| 9,327,656 B2* | 5/2016 | Sugie | ................... | B60R 13/025 |
| 9,394,018 B2* | 7/2016 | Kisaku | .................. | B62D 65/02 |
| 9,399,491 B2* | 7/2016 | Watanabe | ............. | B62D 27/023 |
| 9,598,112 B1* | 3/2017 | Bach | .................... | B62D 29/008 |
| 9,751,568 B2* | 9/2017 | Bach | .................... | B62D 27/023 |
| 9,868,470 B2* | 1/2018 | Emura | .................. | B62D 25/04 |
| 9,988,087 B2* | 6/2018 | Yamamoto | ........... | B62D 21/152 |
| 10,059,375 B2* | 8/2018 | Emura | .................. | B62D 25/04 |
| 10,112,654 B1* | 10/2018 | Muckenhirn | ........ | B62D 29/007 |
| 10,549,785 B2* | 2/2020 | Lee | ........................ | B62D 25/04 |
| 10,640,150 B2* | 5/2020 | Masuda | ................. | B62D 25/02 |
| 10,640,152 B2* | 5/2020 | Mizohata | ............. | B62D 27/023 |
| 10,737,731 B2* | 8/2020 | Miura | ................... | B60J 5/0422 |
| 10,745,060 B2* | 8/2020 | Kawashita | ............. | B62D 65/00 |
| 2001/0054831 A1* | 12/2001 | Akasaka | ................ | B62D 25/08 180/309 |
| 2003/0102697 A1* | 6/2003 | Yakata | ................... | B62D 25/02 296/209 |
| 2006/0138807 A1* | 6/2006 | Hasegawa | ............. | B62D 25/04 296/193.06 |
| 2007/0108742 A1* | 5/2007 | Itakura | .................. | B60R 21/213 280/728.3 |
| 2010/0060037 A1* | 3/2010 | Terai | ....................... | B60R 13/04 296/193.06 |
| 2010/0231003 A1* | 9/2010 | Okumura | ............. | B62D 21/157 296/193.06 |
| 2011/0266833 A1* | 11/2011 | Hattori | ................. | B62D 25/088 296/187.12 |
| 2012/0274099 A1* | 11/2012 | Tamura | ................. | B62D 25/04 296/193.06 |
| 2012/0299334 A1* | 11/2012 | Takayama | ........... | B62D 25/2081 296/193.06 |
| 2013/0193719 A1* | 8/2013 | Nakaaki | ................ | B62D 25/06 296/210 |
| 2014/0152053 A1* | 6/2014 | Watanabe | ............ | B62D 25/025 296/193.06 |
| 2014/0319877 A1* | 10/2014 | Hida | .................... | B62D 25/025 296/191 |
| 2014/0354012 A1* | 12/2014 | Nagai | .................. | B62D 27/023 296/193.06 |
| 2016/0039466 A1* | 2/2016 | Yamamoto | ............. | B62D 25/04 296/193.06 |
| 2016/0194033 A1 | 7/2016 | Konda | | |
| 2016/0257344 A1* | 9/2016 | Hasegawa | ............. | B62D 25/04 |
| 2016/0257345 A1* | 9/2016 | Hasegawa | ............. | B62D 25/025 |
| 2017/0210425 A1* | 7/2017 | Sekiguchi | ............. | B62D 21/152 |
| 2019/0039553 A1* | 2/2019 | Komura | ............... | B60J 10/7775 |
| 2019/0152419 A1* | 5/2019 | Tanaka | .................. | B60R 13/025 |
| 2019/0217900 A1* | 7/2019 | Ikeda | .................... | B62D 29/001 |
| 2019/0233018 A1* | 8/2019 | Tanaka | ................. | B60R 21/215 |
| 2020/0290680 A1* | 9/2020 | Tahara | .................. | B62D 25/08 |

FOREIGN PATENT DOCUMENTS

| | | |
|---|---|---|
| JP | 2009-029201 A | 2/2009 |
| JP | 2012-187948 A | 10/2012 |
| JP | 2016-112914 A | 6/2016 |
| WO | 2011/118107 A1 | 9/2011 |
| WO | 2015/034023 A1 | 3/2015 |

* cited by examiner

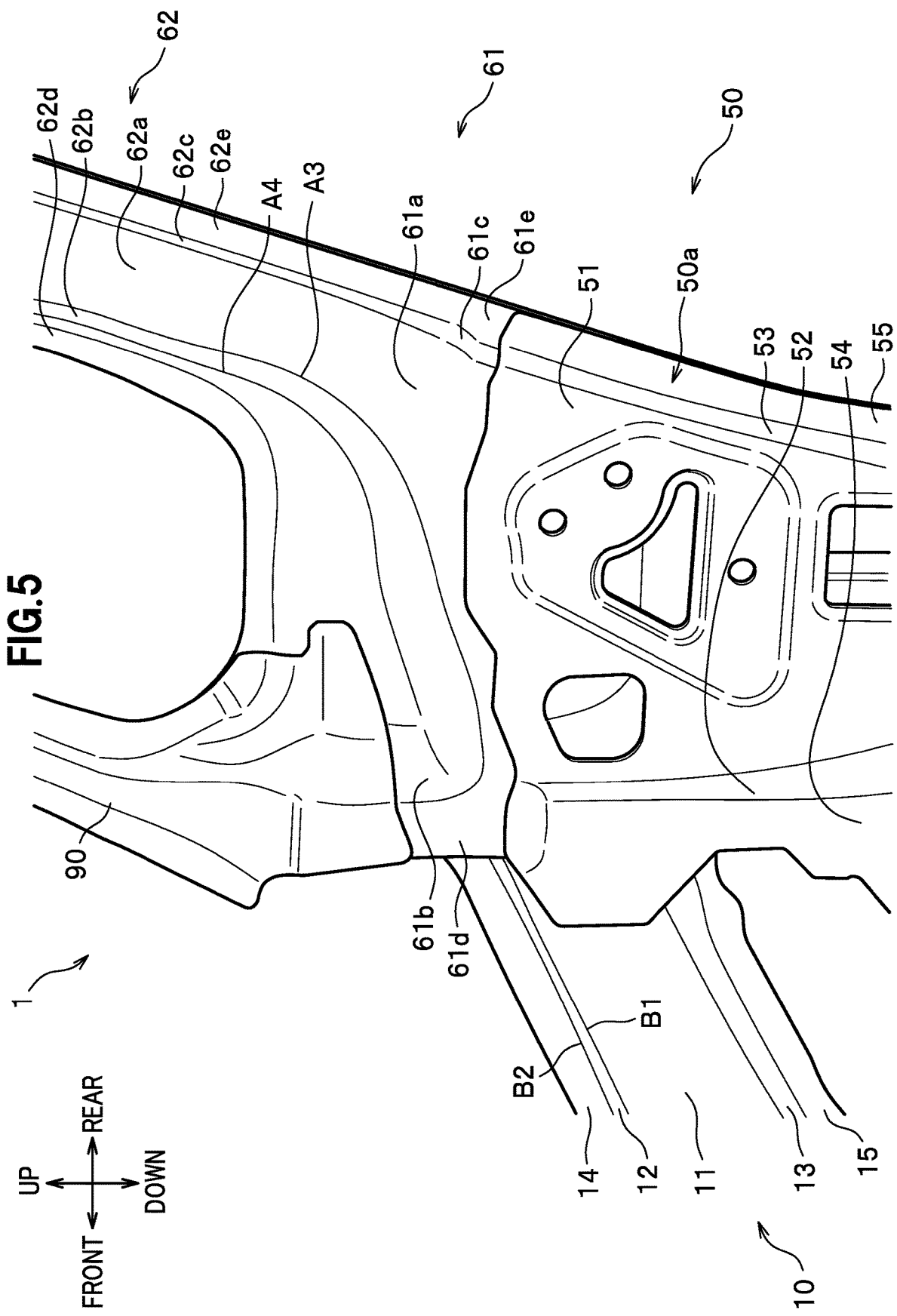

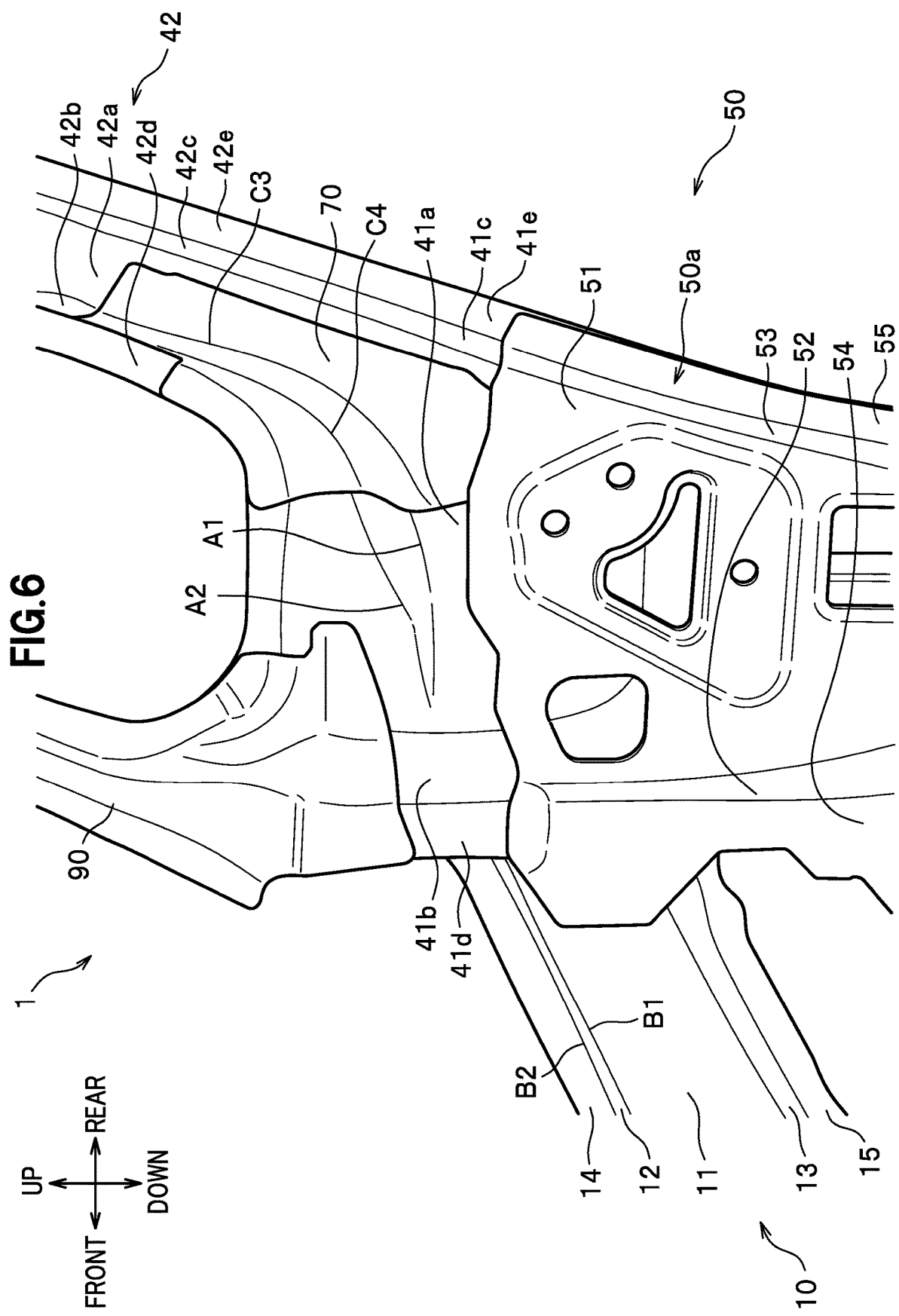

VEHICLE BODY FRONT STRUCTURE

TECHNICAL FIELD

The present invention relates to a vehicle body front structure of a vehicle.

BACKGROUND ART

Patent Literature 1 describes a technique for transmitting a front collision load from an upper member to a front pillar in a vehicle.

CITATION LIST

Patent Literature

Patent Literature 1: Japanese Patent Application Publication No. 2012-187948

SUMMARY OF INVENTION

Technical Problem

A vehicle body front structure described in Patent Literature 1 includes, as the front pillar, an A-pillar on a front side and an A'-pillar on a rear side. Such a vehicle body front structure is configured such that a front collision load input to the upper member is transmitted mainly to the A-pillar on the front side. Therefore, high anti-collision performance is necessary for the A-pillar. It is difficult to thin the A-pillar to ensure driver's view.

The present invention has been devised in view of the point described above, and an object of the present invention is to provide a vehicle body front structure capable of ensuring both of driver's view and anti-collision performance.

Solution to Problem

To solve the above problem, a vehicle body front structure of the present invention includes: a front pillar including a first front pillar extended in an up-down direction, a second front pillar extended in the up-down direction behind the first front pillar, and a lower frame portion connecting lower ends of the first front pillar and the second front pillar; and an upper member provided above a wheelhouse and connected to an upper-member connecting portion of the lower frame portion. A ridge line is formed from the upper-member connecting portion to the lower frame portion and the second front pillar.

Advantageous Effects of Invention

According to the present invention, a front collision load can be transmitted to the second front pillar by the ridge line. Therefore, it is possible to thin the first pillar and ensure both of the driver's view and anti-collision performance.

BRIEF DESCRIPTION OF DRAWINGS

FIG. 5 is a side view of the vehicle body front structure according to the embodiment of the present invention viewed from inward in the vehicle width direction.

FIG. 6 is a side view of the vehicle body front structure according to the embodiment of the present invention viewed from inward in the vehicle width direction and is a diagram showing a state in which a pillar inner upper shown in FIG. 5 is removed.

DESCRIPTION OF EMBODIMENTS

Figure 1:
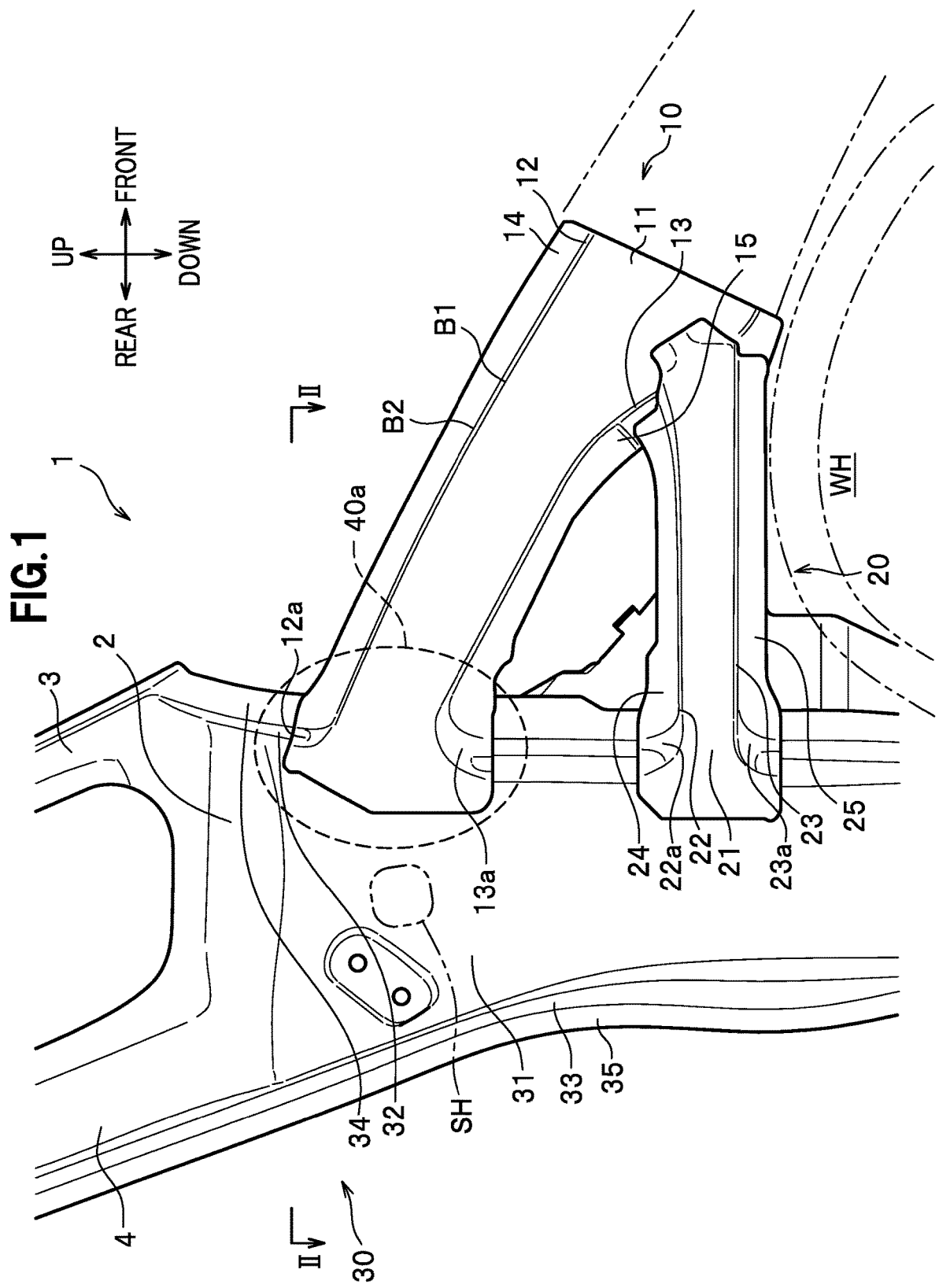
FIG. 1 is a side view of a vehicle body front structure according to an embodiment of the present invention viewed from outward in a vehicle width direction.

An embodiment of the present invention is explained in detail with reference to the drawings citing an example in which a vehicle body front structure of the present invention is applied around an upper member and a front pillar on the right side of a vehicle. In the explanation, the same elements are denoted by the same reference numerals and signs and redundant explanation of the elements is omitted. Note that "front-rear" indicated by an arrow in the figures indicates a vehicle body front-rear direction, "up-down" indicated by an arrow in the figures indicates a vehicle body up-down direction, and "left-right" indicated by an arrow in the figures indicates a front-right direction (a vehicle width direction) viewed from a driver's seat. In the following explanation, a plane including an up-down axis and a left-right axis (a plane orthogonal to a front-rear axis) is referred to as frontal plane, a plane including the up-down axis and the front-rear axis (a plane orthogonal to the left-right axis) is referred to as sagittal plane, and a plane including the front-rear axis and the left-right axis (a plane orthogonal to the up-down axis) is referred to as horizontal plane.

As shown in FIG. 1, a vehicle body front structure 1 according to the embodiment of the present invention includes, as a front pillar, a lower frame portion 2, an A-pillar (a first front pillar) 3 on the front side extended upward from the front end of the lower frame portion 2, and an A'-pillar (a second front pillar) 4 on the rear side extended upward from the rear end of the lower frame portion 2. That is, the lower ends of the A-pillar 3 and the A'-pillar 4 respectively extended in the up-down direction are connected by the lower frame portion 2. A not-shown front windshield glass is provided between a pair of left and right A-pillars 3. A not-shown side glass is provided between the A-pillar 3 and the A'-pillar 4.

The vehicle body front structure 1 includes a top-side upper member 10, a bottom-side upper member 20, a side panel 30, a pillar outer 40, a pillar inner lower 50, a pillar inner upper 60, a pillar inner stiffener 70, a hinge attachment member 80, an A-pillar inner 90, and an A-pillar outer (not shown in the figure). That is, the vehicle body front structure 1 adopts a configuration in which one upper member in the past is divided into the top-side upper member 10 and the bottom-side upper member 20 to cause the upper member to branch. That is, the top-side upper member 10, the bottom-side upper member 20, and the lower frame portion 2 of the front pillar assume a triangular frame shape in a side view. A gap is formed among the top-side upper member 10, the bottom-side upper member 20, and the lower frame portion 2 of the front pillar.

The lower frame portion 2 is formed to be a closed cross section in a plan view by a lower frame portion 41 of the pillar outer 40 and a lower frame portion 61 of the pillar inner upper 60 explained below (see FIG. 2) and formed to be a closed cross section in a front view (or a rear view) by the lower frame portion 41 of the pillar outer 40, the pillar inner lower 50, and the lower frame portion 61 of the pillar inner upper 60 (see FIG. 4). The A-pillar 3 is formed to be a closed cross section in a plan view by the A-pillar inner 90 and the A-pillar outer. The A'-pillar 3 is formed to be a closed cross section in a plan view by an A'-pillar portion 42 of the pillar outer 40 and an A'-pillar portion 61 of the pillar inner upper 60 explained below. Internal spaces of these closed cross sections are connected by openings in a connecting part of the lower frame portion 2 and the A' pillar 4. The closed cross section of the lower frame portion 2 and the closed cross section of the A'-pillar 3 are continuous.

Top-Side Upper Member

The top-side upper member 10 is a structure member (a skeleton member) made of metal extended in the front-rear direction above a wheelhouse WH for a front wheel. The top-side upper member 10 is inclined upward toward the rear. The top-side upper member 10 is formed by joining, with welding or the like, an inner member configuring a vehicle width direction inner portion and an outer member configuring a vehicle width direction outer portion.

The top-side upper member 10 assumes a substantially rectangular closed sectional shape on a frontal plane. The front end of the top-side upper member 10 is joined to the front end of a not-shown front side member by welding or the like via a member (indicated by a dotted line) or the like on the front side. The member on the front side is inclined upward toward the rear like the top-side upper member 10. The rear end of the top-side upper member 10 is joined to a height-direction middle portion of the pillar outer 40 by welding or the like via the side panel 30.

In the following explanation, the outer member of the top-side upper member 10 is referred to as top-side upper member 10. The top-side upper member 10 assumes a substantial hat shape in an axial view and integrally includes an outer wall portion 11 extending in a sagittal plane direction, an upper wall portion 12 extended inward in the vehicle width direction from the upper end of the outer wall portion 11, a lower wall portion 13 extended inward in the vehicle width direction from the lower end of the outer wall portion 11, a flange portion 14 extended upward from the vehicle width direction inner end of the upper wall portion 12, and a flange portion 15 extended downward from the vehicle width direction inner end of the lower wall portion 13.

The rear end of the outer wall portion 11 is joined to an outer wall portion 31 of the side panel 30 by welding or the like. The upper wall portion 12 is extended inward in the vehicle width direction from the front end of the upper end to the vicinity of the rear end of the outer wall portion 11. The rear end of the upper wall portion 12 is formed to be bent upward and configures a wall portion 12a extended in the frontal plane direction between the rear end of the outer wall portion 11 and the rear end of the flange portion 14. The lower wall portion 13 is extended inward in the vehicle width direction from the front end of the lower end to the vicinity of the rear end of the outer wall portion 11. The rear end of the lower wall portion 13 is formed to be bent downward and configures a wall portion 13a extending in the frontal plane direction between the rear end of the outer wall portion 11 and the rear end of the flange portion 15. The flange portion 14 is extended upward from the front end of the vehicle width direction inner end to the rear end of the upper wall portion 12 and extends in the sagittal plane direction. The flange portion 14 is joined to the upper end of a not-shown inner member of the top-side upper member 10 by welding or the like. The flange portion 15 is extended downward from the front end of the vehicle width direction inner end to the rear end of the lower wall portion 13 and extends in the sagittal plane direction. The flange portion 15 is joined to the lower end of the not-shown inner member of the top-side upper member 10 by welding or the like.

In such a top-side upper member 10, a ridge line B1 is formed between the outer wall portion 11 and the upper wall portion 12. A ridge line B2 is formed between the upper wall portion 12 and the flange portion 14. The ridge lines B1 and B2 are respectively extended in an extending direction (a longitudinal direction) of the top-side upper member 10.

Bottom-Side Upper Member

The bottom-side upper member 20 is a structure member (a skeleton member) made of metal branching from the top-side upper member 10 and extended in the front-rear direction above the wheelhouse WH and below the top-side upper member 10. The bottom-side upper member 20 is extended in the horizontal direction. The bottom-side upper member 20 is formed by joining, with welding or the like, an inner member configuring the vehicle width direction inner portion and an outer member configuring the vehicle width direction outer portion.

The bottom-side upper member 20 assumes a substantially rectangular closed sectional shape on the frontal plane. The front end of the bottom-side upper member 20 is joined to the lower end of the front end of the top-side upper member 10 by welding or the like. The rear end of the bottom-side upper member 20 is joined to a height-direction middle portion of the pillar outer 40 (below the joining part of the top-side upper member 10) via the side panel 30.

In the following explanation, the outer member of the bottom-side upper member 20 is referred to as bottom-side upper member 20. The bottom-side upper member 20 assumes a substantial hat shape in an axial view and integrally includes an outer wall portion 21 extending in the sagittal plane direction, an upper wall portion 22 extended inward in the vehicle width direction from the upper end of the outer wall portion 21, a lower wall portion 23 extended inward in the vehicle width direction from the lower end of the outer wall portion 21, a flange portion 24 extended upward from the vehicle width direction inner end of the upper wall portion 22, and a flange portion 25 extended downward from the vehicle width direction inner end of the lower wall portion 23.

The front end of the outer wall portion 21 is joined to the outer wall portion 11 of the top-side upper member 10 by welding or the like. The rear end of the outer wall portion 21 is joined to the outer wall portion 31 of the side panel 30 by welding or the like. The upper wall portion 22 is extended inward in the vehicle width direction from the vicinity of the front end to the vicinity of the rear end of the upper end of the outer wall portion 21. The rear end of the upper wall portion 22 is formed to be bent upward and configures a wall portion 22a extending in the frontal plane direction between the rear end of the outer wall portion 21 and the rear end of the flange portion 24. The lower wall portion 23 is extended inward in the vehicle width direction from the vicinity of the front end to the vicinity of the rear end of the lower end of the outer wall portion 21. The rear end of the lower wall portion 23 is formed to be bent downward and configures a wall portion 23a extending in the frontal plane direction between the rear end of the outer wall portion 21 and the rear end of the flange portion 25. The flange portion 24 is extended upward from the front end to the rear end of the vehicle width direction inner end of the upper wall portion 22 and extends in the sagittal plane direction. The flange portion 24 is joined to the upper end of a not-shown inner member of the bottom-side upper member 20 by welding or the like. The flange portion 25 is extended downward from the front end to the rear end of the vehicle width direction inner end of the lower wall portion 13 and extends in the sagittal plane direction. The flange portion 25 is joined to the lower end of the not-shown inner member of the bottom-side upper member 20 by welding or the like.

Side Panel

Figure 2:
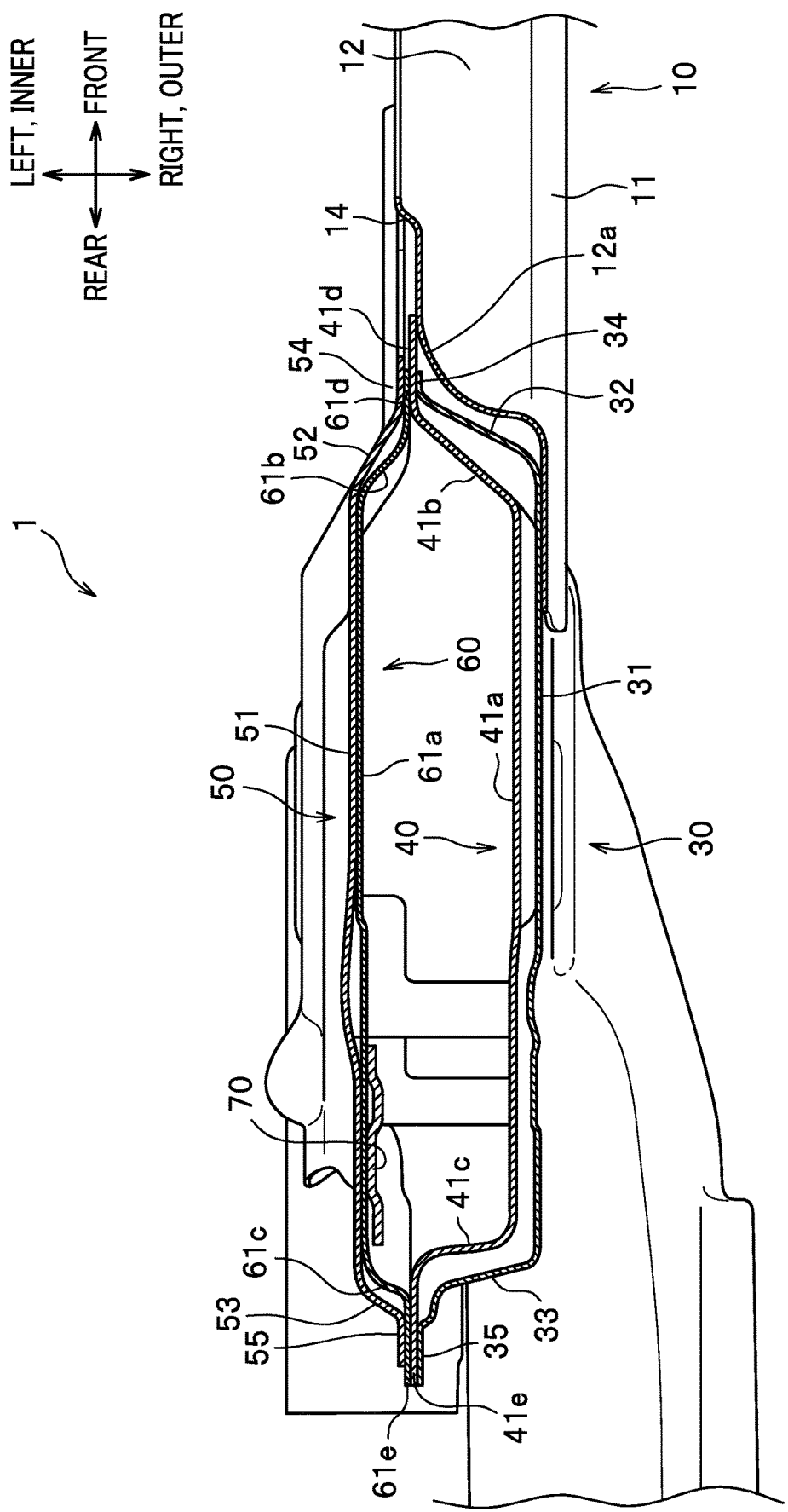
FIG. 2 is a II-II sectional view of FIG. 1.

As shown in FIGS. 1 and 2, the side panel 30 is a member made of metal configuring a lower portion of a vertical frame portion on the front side in a door opening portion in which a side door (not shown in the figures) for a vehicle front seat is provided. The side panel 30 integrally includes an outer wall portion 31 extending in the sagittal plane direction, a front wall portion 32 extended inward in the vehicle width direction from the front end of the outer wall portion 31, a rear wall portion 33 extended inward in the vehicle width direction from the rear end of the outer wall portion 31, a flange portion 34 extended forward from the vehicle width direction inner end of the front wall portion 32, and a flange portion 35 extended rearward from the vehicle width direction inner end of the rear wall portion 33.

The rear end of the outer wall portion 11 of the top-side upper member 10 and the rear end of the outer wall portion 21 of the bottom-side upper member 20 are respectively joined to the front end of the outer wall portion 31 by welding or the like. The wall portions 12a and 13a of the top-side upper member 10 and the wall portions 22a and 23a of the bottom-side upper member 20 are respectively joined to the front wall portion 32 by welding or the like. The rear ends of the flange portions 14 and 15 of the top-side upper member 10 and the rear ends of the flange portions 24 and 25 of the bottom-side upper member 20 are respectively joined to the flange portion 34 by welding or the like.

Pillar Outer

Figure 3:
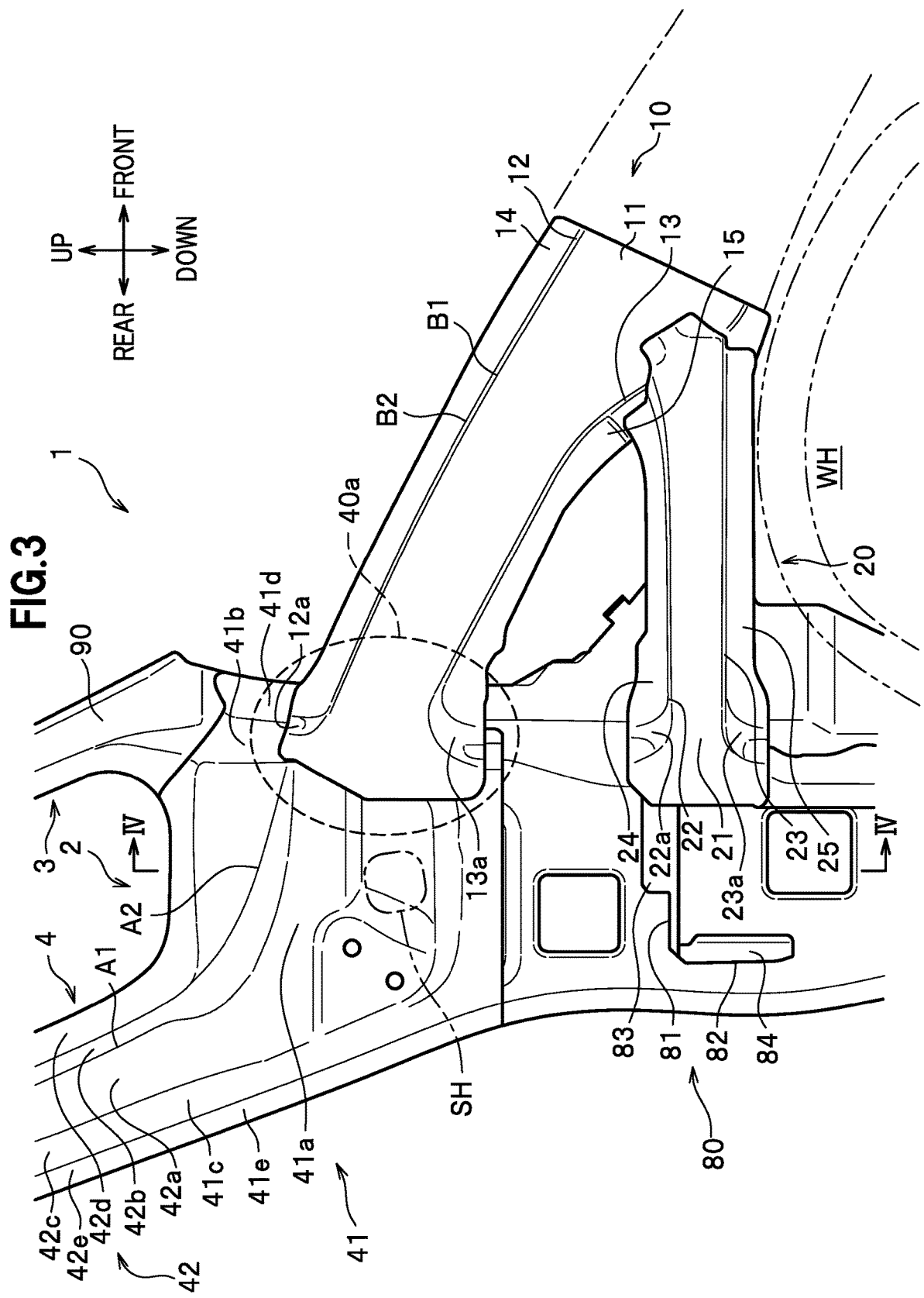
FIG. 3 is a side view of the vehicle body front structure according to the embodiment of the present invention viewed from outward in the vehicle width direction and is a diagram showing a state in which a side panel shown in FIG. 1 is removed.

As shown in FIG. 3, the pillar outer 40 is an outer member made of metal configuring the lower frame portion 2 of the front pillar and a vehicle width direction outer portion of the A'-pillar 4. The pillar outer 40 integrally includes the lower frame portion 41 and the A'-pillar portion 42 extended upward from the rear end of the lower frame portion 41.

The lower frame portion 41 integrally includes an outer wall portion 41a extending in the sagittal plane direction, a front wall portion 41b extended inward in the vehicle width direction from the front end of the outer wall portion 41a, a rear wall portion 41c extended inward in the vehicle width direction from the rear end of the outer wall portion 41a, a flange portion 41d extended forward from the vehicle width direction inner end of the front wall portion 41b, and a flange portion 41e extended rearward from the vehicle width direction inner end of the rear wall portion 41c.

The front wall portion 32 of the side panel 30 and the wall portion 12a of the top-side upper member 10 superimposed in the front are joined to the front wall portion 41b by the welding or the like in the front-rear direction. The front wall portion 32 of the side panel 30 and the wall portion 13a of the top-side upper member 10 superimposed in the front are joined to the front wall portion 41 by welding or the like in the front-rear direction. The front wall portion 32 of the side panel 30 and the wall portion 22a of the bottom-side upper member 20 superimposed in the front are joined to the front wall portion 41b by welding or the like in the front-rear direction. The front wall portion 32 of the side panel 30 and the wall portion 23a of the bottom-side upper member 20 superimposed in the front are joined to the front wall portion 41b by welding or the like in the front-rear direction. That is, the front end of the lower frame portion 41 is formed as an upper-member connecting portion 40a to which the top-side upper member 10 is connected.

The A'-pillar portion 42 integrally includes an outer wall portion 42a extending in the sagittal plane direction, a front wall portion 42b extended inward in the vehicle width direction from the front end of the outer wall portion 42a, a rear wall portion 42c extended inward in the vehicle width direction from the rear end of the outer wall portion 42a, a flange portion 42d extended forward from the vehicle width direction inner end of the front wall portion 42b, and a flange portion 42e extended rearward from the vehicle width direction inner end of the rear wall portion 42c.

The outer wall portion 42a is a part extending upward from the upper end of the outer wall portion 41a of the lower frame portion 41. The rear wall portion 42c is a part extending upward from the upper end of the rear wall portion 42c of the lower frame portion 41. The flange portion 42e is a part extending upward from the upper end of the flange portion 41e of the lower frame portion 41.

Pillar Inner Lower

As shown in FIG. 5, the pillar inner lower 50 is an inner member made of metal configuring a vehicle width direction inner portion of the lower frame portion 2 of the front pillar.

The pillar inner lower 50 integrally includes an inner wall portion 51 extending in the sagittal plane direction, a front wall portion 52 extended outward in the vehicle width direction from the front end of the inner wall portion 51, a rear wall portion 53 extended outward in the vehicle width direction from the rear end of the inner wall portion 51, a flange portion 54 extended forward from the vehicle width direction outer end of the front wall portion 52, and a flange portion 55 extended rearward from the vehicle width direction outer end of the rear wall portion 53.

A steering-hanger attaching portion 50a, to which a steering hanger SH (see FIG. 1) is fixed (for example, joined by welding or the like), is formed near an upper-member connecting portion 20a of the pillar inner lower 50.

Pillar Inner Upper

As shown in FIG. 5, the pillar inner upper 60 is an outer member made of metal configuring the lower frame portion 2 of the front pillar and the vehicle width direction outer portion of the A'-pillar 4.

The pillar inner upper 60 integrally includes the lower frame portion 61 and the A'-pillar portion 62 extended upward from the rear end of the lower frame portion 61.

The lower frame portion 61 integrally includes an inner wall portion 61a extending in the sagittal plane direction, a front wall portion 61b extended outward in the vehicle width direction from the front end of the inner wall portion 61a, a rear wall portion 61c extended outward in the vehicle width direction from the rear end of the inner wall portion 61a, a flange portion 61d extended forward from the vehicle width direction outer end of the front wall portion 61b, and a flange portion 61e extended rearward from the vehicle width direction outer end of the rear wall portion 61c.

The A'-pillar portion 62 integrally includes an inner wall portion 62a extending in the sagittal plane direction, a front wall portion 62b extended outward in the vehicle width direction from the front end of the inner wall portion 62a, a rear wall portion 62c extended outward in the vehicle width direction from the rear end of the inner wall portion 62a, a flange portion 62d extended forward from the vehicle width direction outer end of the front wall portion 62b, and a flange portion 62e extended rearward from the vehicle width direction outer end of the rear wall portion 62c.

The inner wall portion 62a is apart extending upward from the upper end of the inner wall portion 61a of the lower frame portion 61. The rear wall portion 62c is apart extending upward from the upper end of the rear wall portion 62c of the lower frame portion 61. The flange portion 62e is a part extending upward from the upper end of the flange portion 61e of the lower frame portion 61.

As shown in FIG. 2, the flange portion 34 of the side panel 30, the flange portion 41d of the pillar outer 40, the flange portion 61d of the pillar inner upper 60, the flange portion 54 of the pillar inner lower 50 are superimposed in order from the vehicle width direction outer side. Two or three of the flange portions are joined by welding or the like as appropriate. The flange portions are joined as a whole by being changed in a combination and joined in a plurality of parts.

The flange portion 35 of the side panel 30, the flange portion 41e of the pillar outer 40, the flange portion 61e of the pillar inner upper 60, and the flange portion 55 of the pillar inner lower 50 are superimposed in order from the vehicle width direction outer side. Two or three of the flange portions are joined by welding or the like as appropriate. The flange portions are joined as a whole by being changed in a combination and joined in a plurality of parts.

Closed Sectional Structure of the Lower Frame Portion

Figure 4:
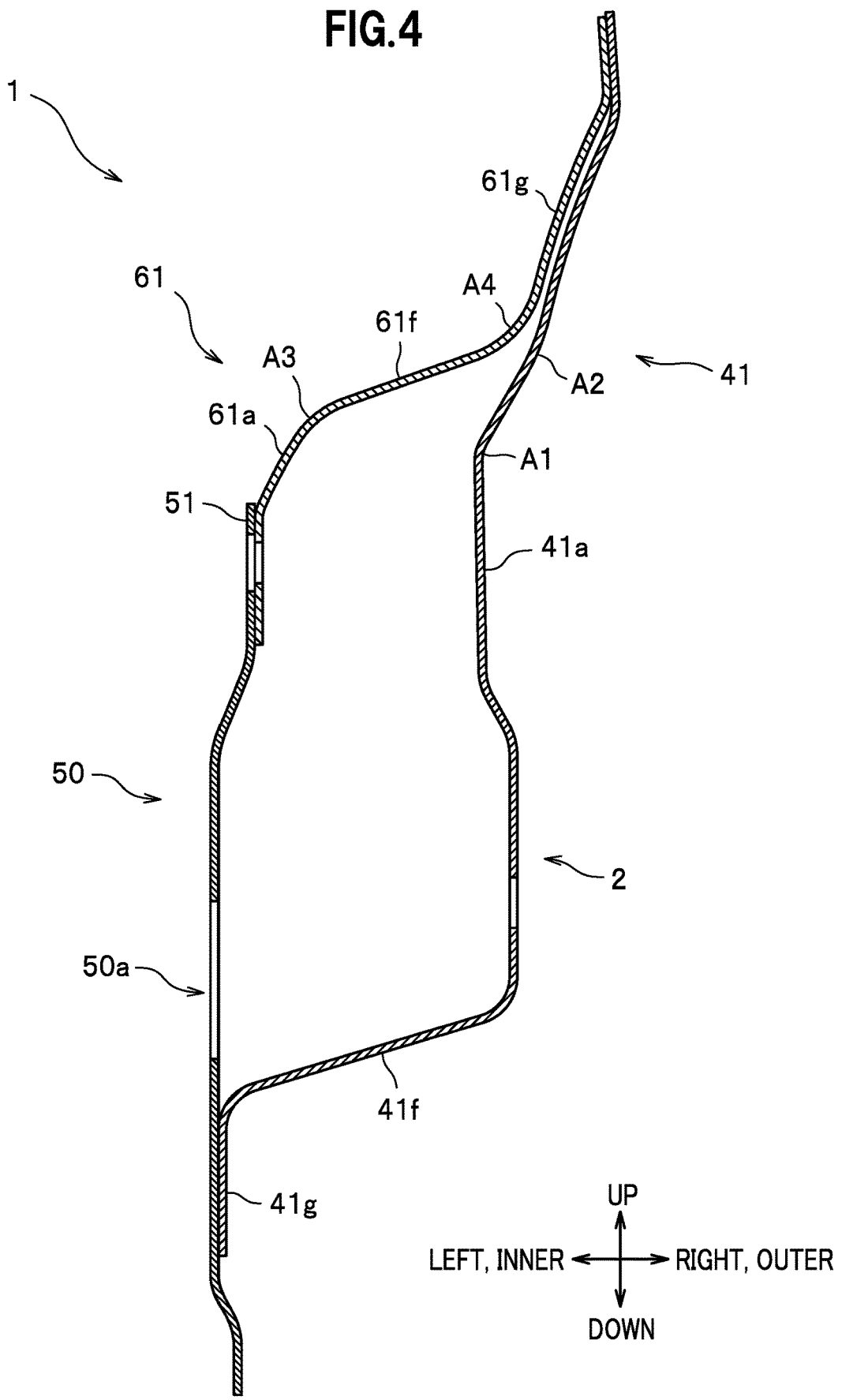
FIG. 4 is a IV-IV line end face view of FIG. 3.

As shown in FIG. 4, the lower frame portion 2 has a closed sectional shape in a front view defined by the lower frame portion 41 of the pillar outer 40, the inner wall portion 51 of the pillar inner lower 50, and the lower frame portion 61 of the pillar inner upper 60. The lower end of the lower frame portion 41 of the pillar outer 40 configures a lower wall portion 41f extended inward in the vehicle width direction and a flange portion 41g extended downward from the vehicle width direction inner end of the lower wall portion 41f and is joined to the inner wall portion 51 of the pillar inner lower 50 by welding or the like in the flange portion 41g. The upper end of the lower frame portion 61 of the pillar inner upper 60 configures an upper wall portion 61f extended inward in the vehicle width direction and a flange portion 61g extended upward from the vehicle width direction inner end of the upper wall portion 61f and is joined to the upper end of the lower frame portion 41 of the pillar outer 40 by welding or the like in the flange portion 61g. The lower end of the lower frame portion 61 of the pillar inner upper 60 is joined to the upper end of the inner wall portion 51 of the pillar inner lower 50 by welding or the like.

Pillar Inner Stiffener

As shown in FIGS. 2 and 6, the pillar inner stiffener 70 is a reinforcing member made of metal joined to, by welding or the like, the vehicle width direction outer surface of a part including the proximal end of the A'-pillar portion 62 of the pillar inner upper 60. The pillar inner stiffener 70 is formed to be bent along the shape of the pillar inner upper 60. That is, ridge lines C3 and C4 corresponding to ridge lines A3 and A4 are formed in the pillar inner stiffener 70.

Hinge Attachment Member

As shown in FIG. 3, the hinge attachment member 80 is a member made of metal provided between the pillar outer 40 and the pillar inner lower 50, a hinge (not shown in the figure) pivotably supporting a side door (not shown in the figure) for a vehicle front seat to be openable and closable being attached to the member made of metal. The hinge attachment member 80 integrally includes an upper wall portion 81 extending in the horizontal plane direction, a rear wall portion 82 extended downward from the rear end of the upper wall portion 81, a flange portion 83 extended upward from the vehicle width direction outer end of the upper wall portion 81, and a flange portion 84 extended forward from the vehicle width direction outer end of the rear wall portion 82. A not-shown hinge is fixed to the rear surface of the rear wall portion 82. The flange portions 83 and 84 are joined to the side panel 30 by welding or the like.

A ridge line between the upper wall portion 81 and the flange portion 83 is formed on an extended line of a ridge line between the upper wall portion 22 and the flange portion 25 of the bottom-side upper member 20 (excluding a portion between the wall portion 22a and the flange portion 24). With such a configuration, it is possible to improve transmission efficiency of a front collision load input to the bottom-side upper member 20.

A-Pillar Inner

As shown in FIG. 6, the A-pillar inner 90 is formed to be bent and configure an inner member made of metal configuring a vehicle width direction inner portion of the A-pillar 3. The lower end of the A-pillar inner 90 is joined to the upper end of the front end of the lower frame portion 61 of the pillar inner upper 60 by welding or the like. The A-pillar inner 90 configures the A-pillar 3 by being formed to be bent and joined to, by welding or the like, the A-pillar outer, which is the outer member made of metal configuring a vehicle width direction outer portion of the A-pillar 3.

As shown in FIG. 3, the pillar outer 40 includes a ridge line A1. The ridge line A1 is a ridge line formed between the outer wall portion 42a and the front wall portion 42b in the A'-pillar portion 42 and curves forward in the lower frame portion 41 to continue to the upper-member connecting portion 40a. In the lower frame portion 41, the ridge line A1 is a vertex convex outward in the vehicle width direction in a front view.

Such a ridge line A1 is formed on an extended line in the extending direction of the top-side upper member 10 in the lower frame portion 41. More in detail, the ridge line A1 is formed on an extended line of the ridge line B1 formed between the outer wall portion 11 and the upper wall portion 12 of the top-side upper member 10 (excluding a portion between the outer wall portion 11 and the wall portion 12a). Note that the ridge line B1 is a vertex convex outward in the vehicle-width direction in a front view.

The pillar outer 40 includes a ridge line A2. The ridge line A2 is a ridge line formed between the front wall portion 42b and the flange portion 42d in the A'-pillar portion 42 and curves forward in the lower frame portion 41 to continue to the upper-member connecting portion 40a. In the lower frame portion 41, the ridge line A2 is a vertex convex inward in the vehicle width direction in a front view. Such a ridge line A2 is formed on the extended line in the extending direction of the top-side upper member 10. More in detail, the ridge line A2 is formed on an extended line of the ridge line B2 formed between the upper wall portion 12 and the flange portion 14 of the top-side upper member 10 (excluding a portion between the wall portion 12a and the flange portion 14). Note that the ridge line B2 is a vertex convex inward in the vehicle width direction in a front view. That is, in the front end to the front-rear direction middle portion of the lower frame portion 41, a portion between the ridge lines A1 and A2 configures an upper wall portion extending in the substantially horizontal direction.

As shown in FIGS. 5 and 6, the pillar inner upper 60 includes a ridge line A3. The ridge line A3 is a ridge line formed between the inner wall portion 62a and the front wall portion 62b in the A'-pillar portion 62 and curves forward in the lower frame portion 61 to continue to the upper-member connecting portion 40a. In the lower frame portion 61, the ridge line A3 is a vertex convex outward in the vehicle width direction in a front view. Such a ridge line A3 is formed on the extended line in the extending direction of the top-side upper member 10 in the lower frame portion 61.

The pillar inner upper 60 includes a ridge line A4. The ridge line A4 is a ridge line formed between the front wall portion 62b and the flange portion 62d in the A'-pillar portion 62 and curves forward in the lower frame portion 61 to continue to the upper-member connecting portion 40a. In the lower frame portion 61, the ridge line A4 is a vertex convex inward in the vehicle width direction in a front view. Such a ridge line A4 is formed on the extended line in the extending direction of the top-side upper member 10 in the lower frame portion 61. That is, in the front end to the front-rear direction middle portion of the lower frame portion 61, a portion between the ridge lines A3 and A4 configure an upper wall portion 61g extending in the substantially horizontal direction (see FIG. 4).

When a front collision load is applied to the vehicle including such a vehicle body front structure 1, in the front collision load, most of a load acting on the upper member is transmitted to the top-side upper member 10 and the remaining portion is transmitted to the bottom-side upper member 20. The front collision load transmitted to the top-side upper member 10 is transmitted from the lower frame portion 41 to the A'-pillar portion 42 by the ridge lines A1 and A2 and transmitted from the lower frame portion 61 to the A'-pillar portion 62 by the ridge lines A3 and A4.

Therefore, the vehicle body front structure 1 according to the embodiment of the present invention can transmit, with the ridge lines A1 to A4, the front collision load to the A'-pillar 4. Therefore, it is possible to thin the A-pillar 3 and ensure both of the driver's view and anti-collision performance.

In the vehicle body front structure 1, since the A-pillar 3 and the A'-pillar 4 are formed as separate components, it is possible to improve molding flexibility of the pillars 3 and 4. Therefore, in the vehicle body front structure 1, it is possible to further thin the A-pillar 3 and more suitably ensure the driver's view. In the vehicle body front structure 1, it is possible to suitably set the shapes of the ridge lines A1 to A4 of the A'-pillar 4.

In the vehicle body front structure 1, the ridge lines A1 to A4 are formed on the extended line in the extending direction of the top-side upper member 10 in the lower frame portions 41 and 61. Therefore, it is possible to improve transmission efficiency of the front collision load.

In the vehicle body front structure 1, the upper member is divided into the top-side upper member 10 and the bottom-side upper member 20 and formed to branch. The ridge lines A1 to A4 are formed on the extended line in the extending direction of the top-side upper member 10 in the lower frame portions 41 and 61. Therefore, it is possible realize a reduction in weight by using the top-side upper member 10 as a main load transmitting member and reducing the bottom-side upper member 20 in size.

The vehicle body front structure 1, in the lower frame portion 61, the ridge lines A1 and A2 are formed on the respective extended lines of the ridge lines B1 and B2 extending in the extending direction of the top-side upper member 10. Therefore, it is possible to suitably transmit the front collision load between these ridge lines. It is possible to further improve the transmission efficiency of the front collision load.

In the vehicle body front structure 1, the closed cross section is formed from the upper-member connecting portion 40a to the lower frame portion 2 and the A'-pillar 4. Therefore, it is possible to further increase the rigidity of the front pillar and further improve the transmission efficiency of the front collision load.

In the vehicle body front structure 1, the top-side upper member 10 is joined to the upper-member connecting portion 20a in the front-rear direction in the wall portions 12a and 13a. Therefore, it is possible to further improve the transmission efficiency of the front collision load.

In the vehicle body front structure 1, the steering hanger SH is fixed to the vicinity of the upper-member connecting portion 40a of the lower frame portion 2 (61). Therefore, it is possible to increase the rigidity of the upper-member connecting portion 40a and further improve the transmission efficiency of the front collision load.

The embodiment of the present invention is explained above. However, the present invention is not limited to the embodiment and can be modified as appropriate in a range not departing from the gist of the present invention. For example, the first front pillar and the second front pillar may be integrally configured.

REFERENCE SIGNS LIST 1 vehicle body front structure
2 lower frame portion (front pillar)
3 A-pillar (first front pillar, front pillar)
4 A'-pillar (second front pillar, front pillar)
10 top-side upper member (first upper member)
20 bottom-side upper member (second upper member)
40 pillar outer
40a upper-member connecting portion
50 pillar inner lower
60 pillar inner upper
70 pillar inner stiffener
A1, A2, A3 A4 ridge line
B1, B2 (upper-member side) ridge line
SH steering hanger
WH wheelhouse

The invention claimed is:
1. A vehicle body front structure comprising:
a front pillar including a first front pillar extended in an up-down direction, a second front pillar extended in the up-down direction behind the first front pillar, and a lower frame portion connecting lower ends of the first front pillar and the second front pillar; and an upper member provided above a wheelhouse and connected to an upper-member connecting portion of the lower frame portion, wherein a ridge line is formed from the upper-member connecting portion to the lower frame portion and the second front pillar.

2. The vehicle body front structure according to claim 1, wherein the first front pillar and the second front pillar are separate components.

3. The vehicle body front structure according to claim 1, wherein, in the lower frame portion, the ridge line is formed on an extended line in an extending direction of the upper member.

4. The vehicle body front structure according to claim 3, wherein the upper member includes a first upper member and a second upper member provided below the first upper member, and in the lower frame portion, the ridge line is formed on an extended line in an extending direction of the first upper member.

5. The vehicle body front structure according to claim 3, wherein in the upper member, an upper-member-side ridge line extending in the extending direction of the upper member is formed, and in the lower frame portion, the ridge line is formed on an extended line of the upper-member-side ridge line.

6. The vehicle body front structure according to claim 1, wherein a closed cross section is formed from the upper-member connecting portion to the lower frame portion and the second front pillar.

7. The vehicle body front structure according to claim 1, wherein the upper member is joined to the upper-member connecting portion in a front-rear direction.

8. The vehicle body front structure according to claim 1, wherein a steering hanger is fixed near the upper-member connecting portion of the lower frame portion.

9. The vehicle body front structure according to claim 2, wherein, in the lower frame portion, the ridge line is formed on an extended line in an extending direction of the upper member.

10. The vehicle body front structure according to claim 2, wherein a closed cross section is formed from the upper-member connecting portion to the lower frame portion and the second front pillar.

11. The vehicle body front structure according to claim 3, wherein a closed cross section is formed from the upper-member connecting portion to the lower frame portion and the second front pillar.

12. The vehicle body front structure according to claim 4, wherein a closed cross section is formed from the upper-member connecting portion to the lower frame portion and the second front pillar.

13. The vehicle body front structure according to claim 5, wherein a closed cross section is formed from the upper-member connecting portion to the lower frame portion and the second front pillar.

14. The vehicle body front structure according to claim 2, wherein the upper member is joined to the upper-member connecting portion in a front-rear direction.

15. The vehicle body front structure according to claim 3, wherein the upper member is joined to the upper-member connecting portion in a front-rear direction.

16. The vehicle body front structure according to claim 4, wherein the upper member is joined to the upper-member connecting portion in a front-rear direction.

17. The vehicle body front structure according to claim 5, wherein the upper member is joined to the upper-member connecting portion in a front-rear direction.

18. The vehicle body front structure according to claim 6, wherein the upper member is joined to the upper-member connecting portion in a front-rear direction.

19. The vehicle body front structure according to claim 2, wherein a steering hanger is fixed near the upper-member connecting portion of the lower frame portion.

20. The vehicle body front structure according to claim 3, wherein a steering hanger is fixed near the upper-member connecting portion of the lower frame portion.

* * * * *